(12) United States Patent
Peschke (10) Patent No.: US 6,397,143 B1
(45) Date of Patent: May 28, 2002

(54) LAYOUT BASED METHOD FOR MAP NAVIGATION

(76) Inventor: George Peschke, 3838 E. Mallard La., Littleton, CO (US) 80120

( * ) Notice: Subject to any disclaimer, the term of this patent is extended or adjusted under 35 U.S.C. 154(b) by 0 days.

(21) Appl. No.: 09/697,470

(22) Filed: Oct. 26, 2000

(51) Int. Cl.⁷ .................. G01C 21/00; G01C 21/26; G06F 165/00
(52) U.S. Cl. ............ 701/208; 701/210; 701/201
(58) Field of Search .................. 701/208, 201, 701/210, 212, 213, 214, 200

(56) References Cited

U.S. PATENT DOCUMENTS

| | | | | |
|---|---|---|---|---|
| 5,948,040 A | * | 9/1999 | DeLorme et al. | 701/201 |
| 5,968,109 A | * | 10/1999 | Israni et al. | 701/208 |
| 6,047,234 A | * | 4/2000 | Cherveny et al. | 701/200 |
| 6,073,076 A | * | 6/2000 | Crowley et al. | 701/208 |
| 6,202,022 B1 | * | 3/2001 | Ando | 701/200 |
| 6,202,060 B1 | * | 3/2001 | Tran | 707/3 |
| 6,205,396 B1 | * | 3/2001 | Teicher et al. | 701/200 |

* cited by examiner

Primary Examiner—William A. Cuchlinski, Jr.
Assistant Examiner—Olga Hernandez
(74) Attorney, Agent, or Firm—Thomas W. Hanson (57) ABSTRACT

A map navigation and display system which emphasizes the use of physical layout and location to identify and select areas to zoom in on. Preferably used to assist users in locating stores and businesses, a central concept is the visual presentation of a shopping center showing the layout of the buildings and stores within the center. Each store is then linked to its own page with details about the business. Higher level maps may also show the layout and location of the shopping centers within a neighborhood or district and within a region. Optional density indicators at the regional level assist users in locating areas with a large number of stores. Optional text search capability supplements the visual methods.

19 Claims, 7 Drawing Sheets

LAYOUT BASED METHOD FOR MAP NAVIGATION

FIELD OF THE INVENTION

This invention relates to methods for navigating through computer based map systems and more specifically to non-text based systems which present the information by physical layout and shape and by relation to geographic landmarks.

BACKGROUND OF THE INVENTION

Traditional maps in both paper and electronic form are well known. They provide information on routes and locations. They perform best in situations where the user knows the starting and destination locations and is seeking a route.

Where the user is unsure of the destination location, maps are often supplemented by an index to assist the user in locating the position of a street address on the map. In electronic form, this may include a search capability based on the address. This search capability may include the option of searching for a business (or personal) name.

These traditional approaches are of little help where the user has neither the name nor the address but knows the general location. This situation is relatively common. The user may have been told "There's a bicycle shop on Main Street, 3 or 4 doors north of $1^{st}$." This may be sufficient to locate the shop, but insufficient to obtain an address or phone number in order to contact the shop. A similar situation occurs when the user has seen the business on a previous visit: "When I went to the hardware store in the strip mall on Broadway, I noticed a music store next door. . . " Again, there is no direct method for identifying the store. There is a need for a method of navigating a map which would allow a user to identify a store (or other entity) by its physical location or proximity to an intersection, other store, or physical landmark.

Traditional approaches are also weak where the user wants to determine what stores are available in a general or specific location. This often occurs where a user has an appointment in a particular location and wants to combine this trip with shopping or needs to purchase a particular item before or after the appointment. There is a need for a map navigation method which will help the user identify the stores which are in the area of a specific location. This may be the immediate vicinity or perhaps several blocks or even miles away.

A similar situation occurs where the user wishes to identify stores along a particular route. This may be a route which the user will be driving and is looking for a particular type of store or the may be a route which was already traversed and the user wants to identify a store which was seen during the drive. There is a need for a method of navigating a map which allows the user to move along a street or road, jumping from one cluster of stores to another, or perhaps from intersection to intersection, while searching for a store of interest.

The above identified needs should preferably be satisfied by an automated system which can be made available either on a single computer or widely distributed via the Internet or other network. Preferably the navigation method should make significant use of visual and graphical cues and techniques to minimize the need for textual input and minimize language barriers. Preferably this navigation method should include the ability to zoom in and out to various levels of resolution while searching. At some level, the method should be capable of presenting detailed information about a particular store or business such as name, address, telephone numbers, hours of operation, etc.

SUMMARY OF THE INVENTION

The present invention is directed to a method of presenting and navigating interactive maps by relying on physical location and layout information rather than text based tools.

According to the invention there is provided a map showing the layout of a shopping center (or other complex), the layout of the stores within the center, and a link from each store to a detailed description page for that store.

According to an aspect of the invention neighborhood maps are provided which encompass and link to the shopping center maps. Regional maps which encompass and link to the neighborhood maps may also be provided. At either, or both, levels, the depiction of the lower level may represent the layout of the shopping centers and their location to assist visual identification.

According to another aspect of the invention navigation symbols may be provided to provide easy movement to adjacent maps of the same level.

Further in accordance with the invention symbolic labels may be used on any of the levels to indicate the type of business in a store without requiring a text description.

Still further in accordance with the invention, text based search capability may be provided as a supplement to allow searching by such characteristics as street name, business name, address, type of business, etc.

The advantages of such a method are that a user can locate a particular store through the use of location and layout information even if the address or even street is unknown. The user can move along a street or jump to adjacent maps in order to broaden the search. The user may zoom in and out to trade resolution for the size of the area displayed. When a store is located, detailed information can be obtained to verify the selection or to allow the store to be contacted or visited.

The above and other features and advantages of the present invention will become more clear from the detailed description of a specific illustrative embodiment thereof, presented below in conjunction with the accompanying drawings.

DETAILED DESCRIPTION OF THE INVENTION

The following discussion focuses on the preferred embodiment of the invention, which provides an aid to navigation in finding and identifying stores However, as will be recognized by those skilled in the art, the disclosed method is applicable to a wide variety of situations in which presentation of data by geographic location and position is desired. Obvious applications would include to make available real estate listings or to present entertainment venues such as theatres and arenas.

Glossary

The following is a brief glossary of terms used herein. The supplied definitions are applicable throughout this specification and the claims unless the term is clearly used in another manner."

Click/Clicking—in general the act of selecting an icon on the screen through the use of a pointing device connected to the computer. Typically this would involve positioning the cursor through the use of a mouse and then clicking a button on the mouse to select the icon. However, those skilled in the art will recognize that any equivalent method using any equivalent device (trackball, light pen, touch screen, etc.) would also be considered "clicking."

Hover—with respect to the use of a mouse or other pointing device, this refers to positioning the cursor over an item of interest, such as an icon, and holding it stationary for a predetermined amount of time. This can be used by some systems to trigger a response such as displaying additional information.

Layout—generally any representation of the physical shape of the structure (Shopping Center, Store, etc.) in question which is sufficiently accurate to be recognizable by the user as corresponding to the actual structure. In the preferred embodiment, this is typically handled by line drawings, but the use of colored or patterned outlines are anticipated.

Link, hyperlink—any of several well known techniques for providing a logical connection from an element within a document (or screen) which refers to a target document or location within a document, where activating the link causes the target to be displayed. Typically the link information is embedded within the first document, but this is not a requirement.

Neighborhood—a geographic area smaller than a Region, encompassing one or more Shopping Centers. It may be presented as an intersection, showing the classic four quadrants (or their equivalent) or a section of one or more streets between intersections.

Region—any geographic area encompassing at least one Neighborhood. Common examples would include a town, county, or metropolitan area.

Shopping Center—a cluster of Stores, whether officially combined into a single entity or not. This could represent an enclosed shopping mall, a strip mall with outdoor access, a commercial district, a group of co-located but independent Stores along a street, or any other cluster of Stores.

Store—any entity which will be presented by the system as a single business establishment. More generally, this could be any physical location corresponding to a single entity. This could include property which is for sale or lease; an entertainment venue; etc. The Store may be within a stand alone structure or it may be one of several within a common building. A Store may be as simple as a cart or kiosk or even a payphone.

Preferred Embodiment

The disclosed invention is described below with reference to the accompanying figures in which like reference numbers designate like parts. Generally, numbers in the 200's refer to prior art elements or elements in the surrounding environment while numbers in the 100's refer to elements of the invention.

Overview

The presentation of maps on a computer or via an Internet browser is a known technique. Existing methods emphasize the use of street names and/or addresses for navigation possibly combined with the ability to zoom in and out in the current screen.

The present invention supports the above capability but extends it to support visual access to the information. The system presents maps in a series of levels, from relatively large area with low resolution to relatively small areas with high resolution. In the preferred embodiment Region, Neighborhood, Shopping Center and Store levels are presented. Clearly, more or fewer levels with different designations and scope could also be used.

In the display of a Region, physical location and layout relative to landmarks, geographic features, and streets are available to identify a Neighborhood or intersection of interest. Physical layout of the Stores or Shopping Centers within the Neighborhood or around the intersection help identify a particular Shopping Center or group of shops. Shape and arrangement of the Stores within a Shopping Center help locate a particular Store. A direct link from the Store's icon on the screen to detailed information about the Store provides direct access to the data.

Throughout the system, street names are displayed for use as either a primary navigation means or as a secondary assist in support of the physical cues. Text search capability is also available to provide conventional access where a street name, Shopping Center name, or Store name is known or is discovered while navigating the system.

In the following description, reference to distinct screens should not be interpreted to imply any particular method of displaying the screens. One may replace the other in the same window; a new window may be created for a new screen; the screens may overlap or be tiled; or any other method of display may be used.

Structure

Figure 1:
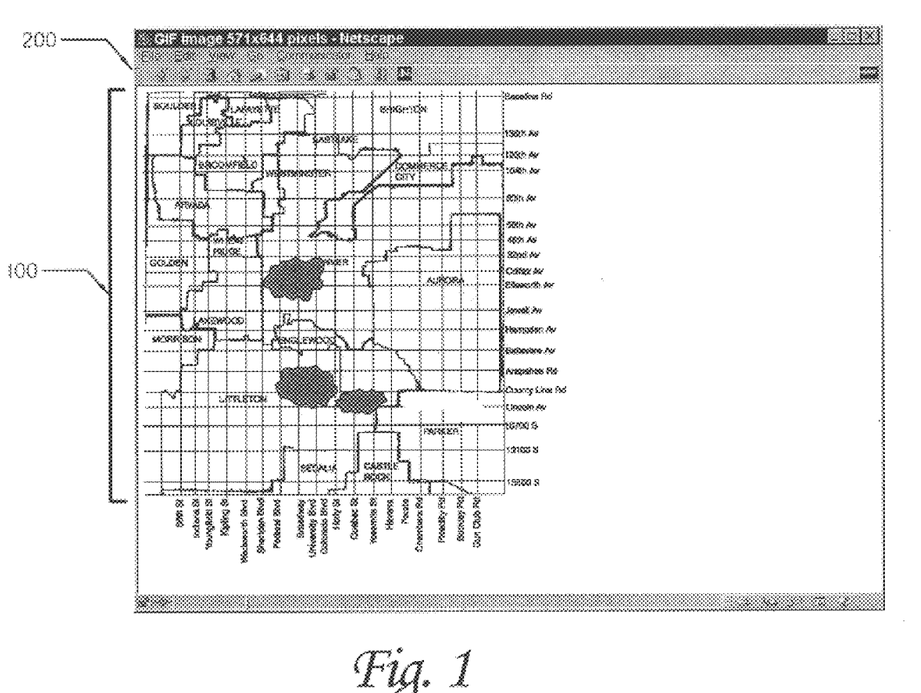
FIG. 1 illustrates a typical Regional display as it might appear in a network browser.

In the preferred embodiment of the system, the various screens, 100, and information will be presented to the user by means of a browser, 200, see FIG. 1. The typical capabilities of the browser will be available to the user. Some of these capabilities, such as the ability to follow an embedded hyperlink will be relied upon to implement the inventive system. However, as the specific browser itself is not a part of the present invention, the browser display will be omitted from most of the remaining figures for clarity.

Figure 2A:
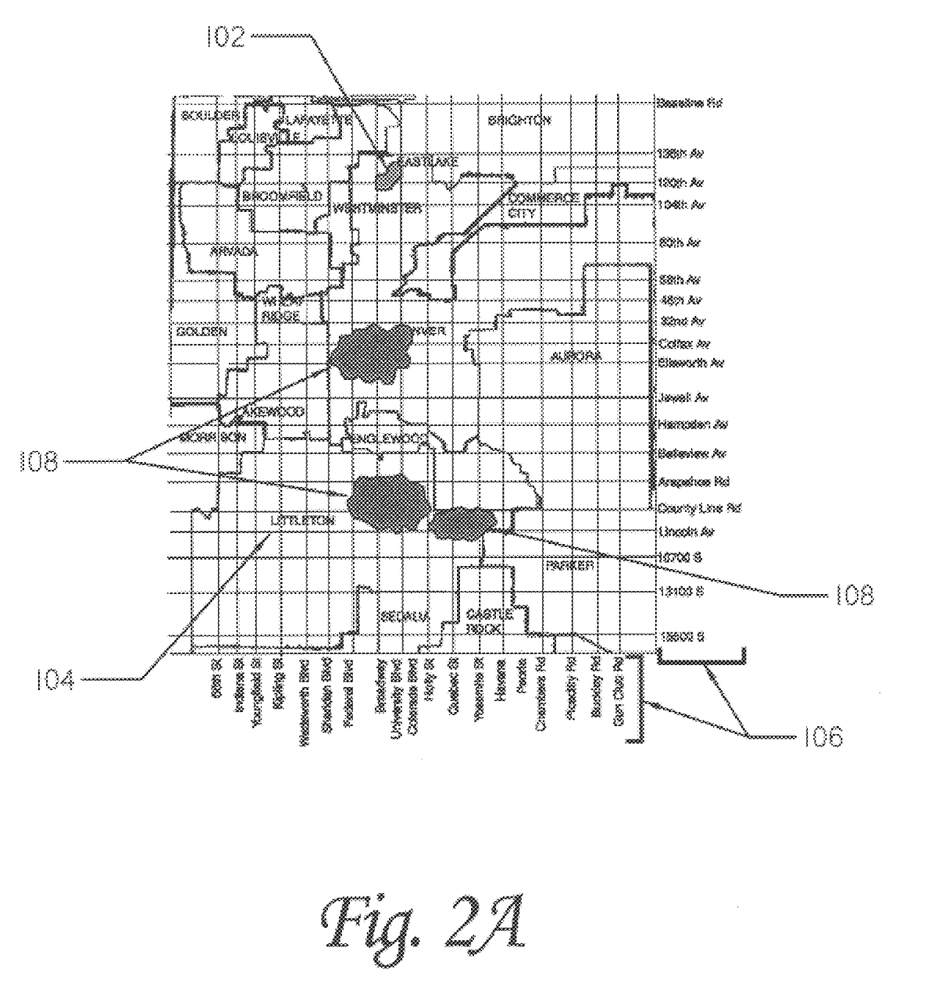
FIG. 2A provides a more detailed view of a Regional display where cloud shapes represent the neighborhoods.
Figure 2B:
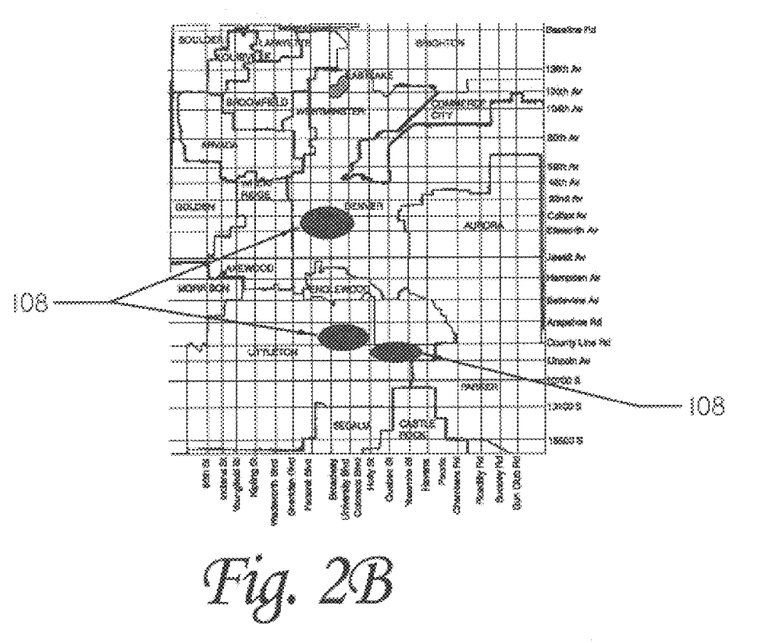
FIG. 2B illustrates an alternative presentation of the Regional display using ovals for the neighborhoods.
Figure 2C:
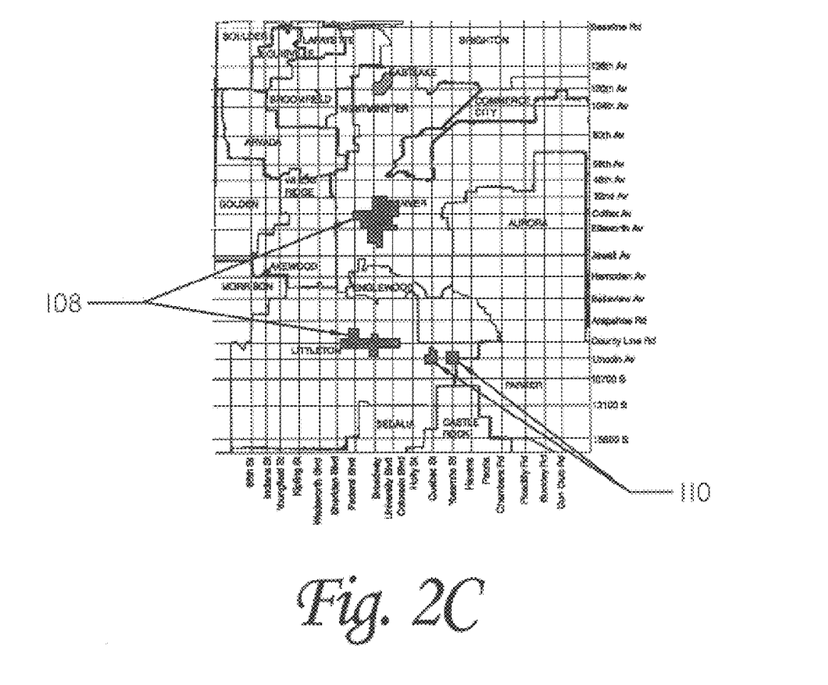
FIG. 2C illustrates an alternative presentation of the Regional display using a layout representation for the neighborhoods.

FIGS. 2A–2C illustrate alternative embodiments of a sample Region display. The Region shows a city, county, metropolitan area, or other relatively broad geographic area. The scope of a Region display is somewhat flexible, the main requirement being that it be possible to display the relevant features with the necessary resolution. This will depend primarily on the size, number, and density of the features to be shown. The Region is the highest level display which is unique to the present invention. Higher level displays, such as states, countries, etc. may be supplied to provide a means of access to the Region displays. They may also be accessed by means of a text search, hyperlink from another system or screen, or by any other appropriate means.

The Region display provides a graphical depiction of geographic features such as lakes, 102, rivers, and mountains; towns, 104, and counties; as well as major streets and roads, 106, as a general grid or as specific traces; which serves as a background map. Overlaid upon this background are icons, 108, representing Neighborhoods, commercial districts, or other concentrations of Stores or Shopping Centers. These icons are properly positioned relative to the elements of the background map so that a user can identify a Neighborhood of interest by reference to the map elements. This is especially valuable to a user attempting to locate an area which has been previously visited but where the exact address or name is unknown. This display is also valuable to a shopper trying to identify a candidate shopping destination because it provides information on the relative size of the Neighborhoods and the proximity of nearby Neighborhoods which would be easily accessible.

The icons can be any of a variety of shapes. FIG. 2A illustrates the use of a "cloud" shape. The size and shape of the cloud can be used to communicate the size and layout of the Neighborhood. FIG. 2B illustrates the use of ovals to mark the Neighborhood locations. While less helpful because it lacks the information suggesting the layout of the Shopping Centers, this approach is more easily and efficiently generated, and size can still be communicated. FIG. 2C illustrates the use of areas composed of rectangular segments to closely approximate the layout of the Shopping Centers within the Neighborhood. This approach is similar to that used on conventional maps to present the location and shapes of towns and cities. Any of these approaches, or a variety of others, could be used as long as the goal of presenting to the user the location of the Neighborhoods relative to the landmarks, and optionally the size and shape of the area, is achieved. Alternatively any of the icons can be supplemented by text labels providing additional information about the Neighborhood. This could include names, streets, types of Stores, etc. They may either be static or appear only when the icon is clicked (using a different key than that to activate the link) or when the cursor "hovers" over the icon. As a further alternative, the icons can be coded with some visual indicator to indicate the relative number (such as density) of Stores or Shopping Centers within the corresponding area. Alternatively, where this approach is used, the entire map may be fully tiled with icons of uniform or varying shape, with each coded to indicate the density. This coding could utilize color, hashing patterns, textures, an alphanumeric or symbolic string, or any other appropriate technique.

Each of the icons, 108, is hyperlinked to a lower level screen, described below, which provides more detailed information. When the user has identified a Neighborhood of interest, they merely click on the icon to activate the hyperlink and bring up the lower level screen. If desired, multiple icons, such as icons 110 on FIG. 2C, could be linked to the same screen.

Figure 3:
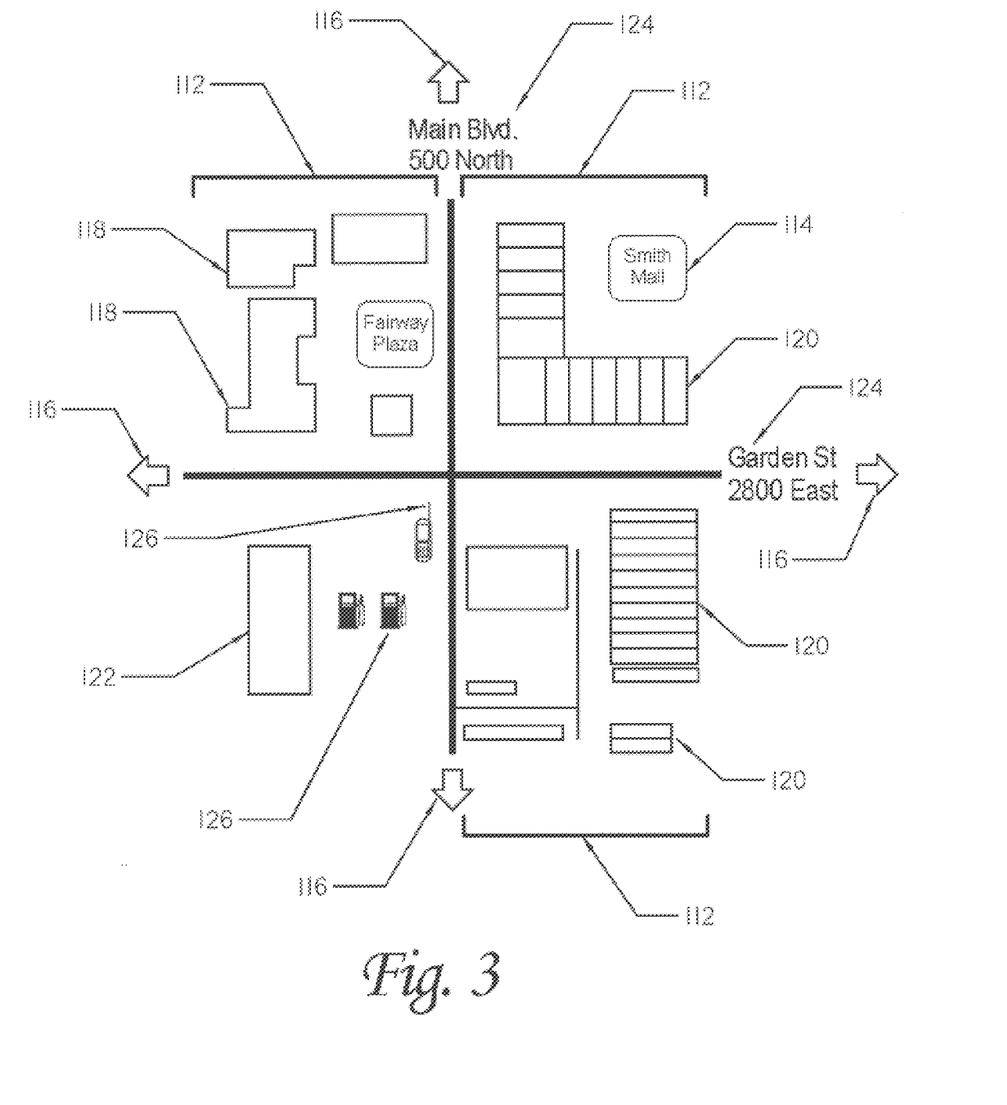
FIG. 3 illustrates a typical neighborhood representation where the neighborhood is centered on an intersection.
Figure 4:
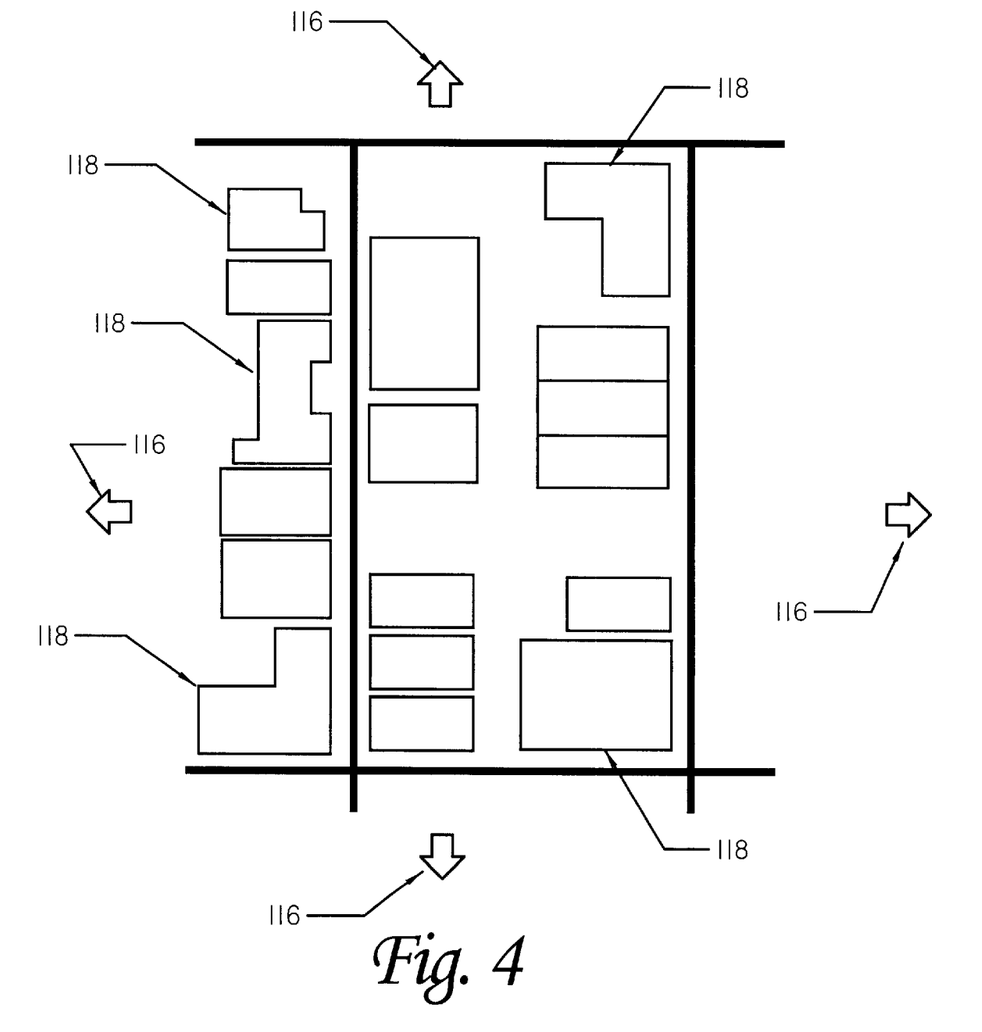
FIG. 4 illustrates a typical neighborhood representation where the neighborhood occupies adjacent streets.

FIG. 3 illustrates an example screen depicting a Neighborhood as would be provided by clicking on an icon on a Region display. Alternatively, this screen could also be accessed through conventional text based search techniques using the street names, Shopping Center names, etc. The screen illustrates the Shopping Centers, 112, located within the neighborhood. In this case, the Neighborhood corresponds to an intersection. It can also be a section of one or more streets between intersections, FIG. 4, a small set of intersections, or any other relatively localized area.

Preferably, the Shopping Centers, 112, are illustrated by showing outlines suggestive of the physical layout of the buildings, 118 and 120, which make up the Shopping Center. This assists the user in recognizing a Shopping Center which has been seen or described. The buildings may be presented only as outlines, 118, or may include interior partitioning, 120, to represent individual Stores. Each of these outlines serves as an icon which is hyperlinked to a more detailed screen providing information about the Shopping Center. A cluster of buildings may be considered a single Shopping Center, or each may be treated as a separate Shopping Center with its own detailed screen. Where a discrete Store, 122, appears on the Neighborhood screen, the system may optionally provide a link directly to that Store's detailed screen, bypassing the Shopping Center level.

If desired, the Neighborhood display may contain any of a variety of optional elements. Shopping Center names may be presented as text strings or as "signs," 114, which may also be linked to the Shopping Center screen. Alternatively the names and/or a description of the Shopping Center will be provided when the user "hovers" the cursor or clicks a different mouse button. Street names and addresses, or address ranges, 124, may be provided on all or some of the streets. Symbolic icons, 126, may be provided to indicate the type of goods or service provided. Navigation arrows, 116, provide convenient navigation to the next neighborhood without moving back up to the next higher level. In the preferred embodiment, clicking an arrow will take the user to the next defined neighborhood having a Shopping Center. Alternatively the arrows could navigate to the next major intersection, or other landmark, in that direction without regard to whether there is a Shopping Center at that location.

Figure 5:
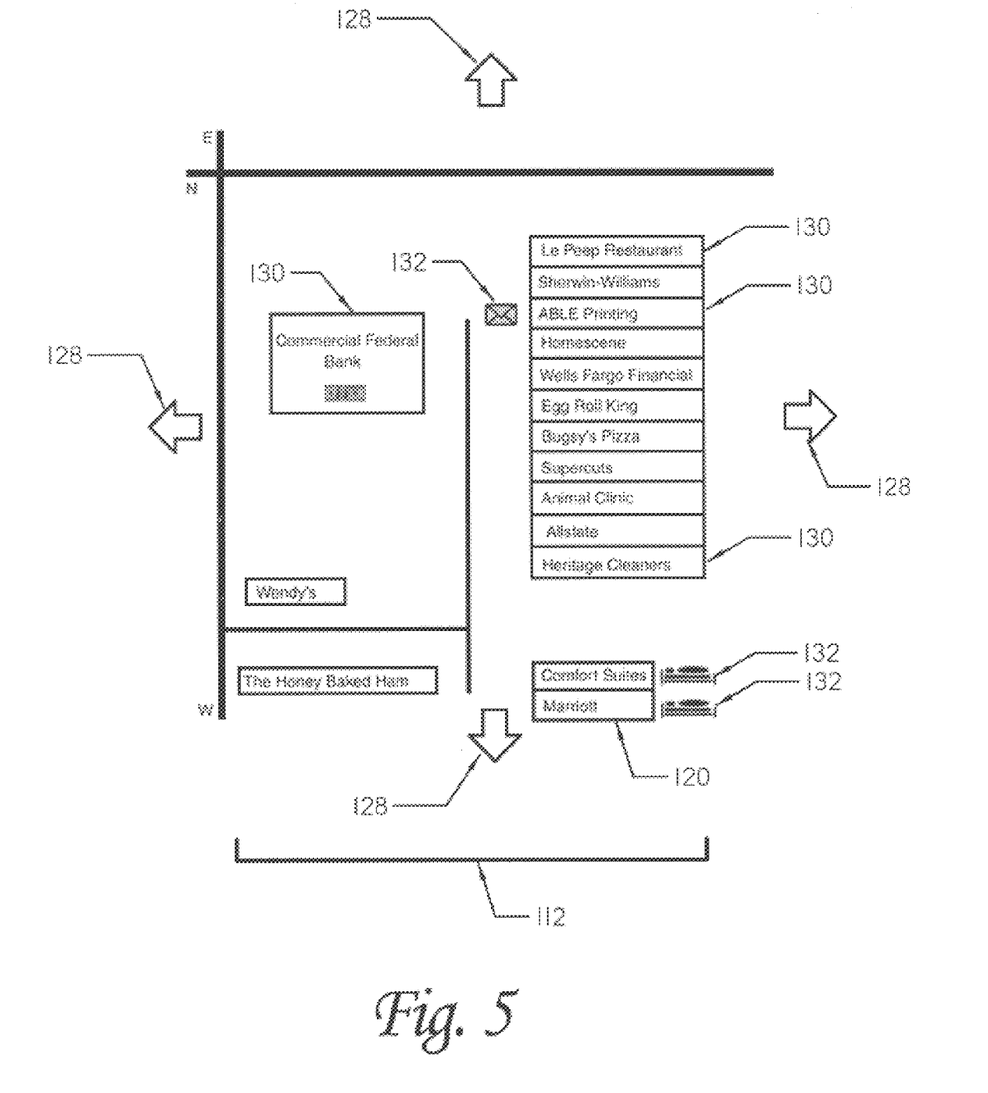
FIG. 5 illustrates a typical shopping center map.

The Shopping Center screen, FIG. 5, provides a more detailed view of a single Shopping Center, 112. Both the building(s), 120, and the Stores, 130, are presented in their relative locations to assist the user in locating a Store. Preferably the presentation is accurate in terms of the relative dimensions in scale to the actual Shopping Center. Each Store is identified by a label representing either the Store's name or type of good or service provided. Alternatively, symbolic icons, 132, may be used to indicate the type of good or service. These icons may be in addition to the label, as shown, or may replace the text label. Each Store (or alternatively the label within the Store) serves as a hyperlink to a screen which provides detailed information about that Store. Preferably, this screen is a part of the present invention. Alternatively, the link may provide a connection to a screen or web site developed and maintained by or for the Store owner or manager. As an added feature, the link for an unoccupied Store may provide access to the property manager or real estate agent responsible for leasing the Store.

The Shopping Center screen, like all of the other screens, also serves the function of a traditional map: it shows the user where the Store is and how to get to it. If desired, it may be printed for use while travelling to the Store. In a similar manner to the Neighborhood screens, navigation arrows, 128, provide access to the next nearest Shopping Center in the specified direction. This may be the adjacent Shopping Center within the same Neighborhood, or it may be in the closest Neighborhood in the specified direction.

Figure 6:
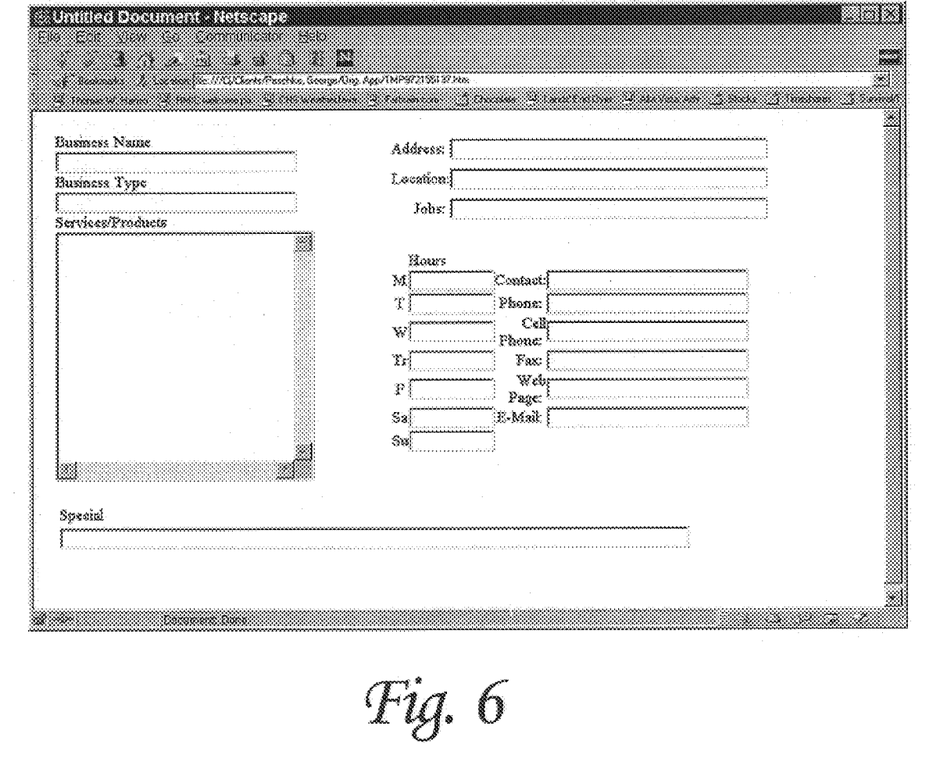
FIG. 6 illustrates a typical store detail screen.

FIG. 6 illustrates a typical Store screen which presents a variety of detailed information about a specific Store. In the preferred embodiment, this is a text based form with a common format for all Stores and contains information supplied and maintained by the manager of the Store itself. This could include a description of the business; address; phone number(s); FAX number; hours of operation, link or web address of the Stores own web page or site; hiring information if positions are available, etc. Alternatively, it could be any format, including graphical (such as a Store map showing the location of departments or goods within the Store) which presents information about the Store. One or more of the fields could provide a link to further information or an e-mail address to send an inquiry to the Store.

An alternative embodiment of the system uses an additional layer of map display between the Region and the Neighborhood. This is useful where there is a relatively high density of Shopping Centers in an area, such as would occur in a business district. This intermediate level display the district as a whole and then allows the user to select a specific Neighborhood/intersection to view. This could also be considered to be a broadening of the coverage of the Neighborhood display and the addition of an "intersection" display between the Neighborhood and the Shopping Center. If desired, the ability to directly select a Shopping Center from the district view could also be provided.

While the preferred form of the invention has been disclosed above, alternative methods of practicing the invention. are readily apparent to the skilled practitioner. The above description of the preferred embodiment is intended to be illustrative only and not to limit the scope of the invention.

I claim:

1. A method of presenting and providing navigation through a series of maps, comprising:
    (a) providing at least one first level map depicting plural store layouts;
    (b) providing description pages corresponding to each of said store layouts comprising information related to said corresponding store; and
    (c) providing links from each of said plural layouts to each of said corresponding description pages whereby activation of said link causes said description page to be displayed.

2. The presentation and navigation method of claim 1 wherein said depiction of said first level map corresponds to a physical area and said method further comprises providing at least one second level map depicting a larger physical area than said first level map, said area encompassing said area of said first level map, and providing a link from said second level map to said first level map.

3. The presentation and navigation method of claim 2 wherein said second level map comprises a depiction of a physical layout corresponding to said first level map and said link from second level map to said first level map is associated with said layout corresponding to said first level map.

4. The presentation and navigation method of claim 3 comprising at least one additional second level map depicting a physical area positioned in a direction relative to said area of the first said second level map and wherein each of said second level maps comprises plural navigational symbols corresponding to relative physical directions and wherein activating one of said navigational symbols causes the display of the nearest of said second level maps depicting an area in that relative direction.

5. The presentation and navigation method of claim 4 wherein said activation of said navigational symbol displays the nearest of said second level maps depicting an area encompassing an area depicted by a second said first level map, skipping any intervening areas not encompassing such an area.

6. The presentation and navigation method of claim 3 wherein said physical layout depicted by said first level map represents the location and shape of a store within a shopping center and said layout depicted by said second level map represents shape of the shopping center.

7. The presentation and navigation method of claim 6 wherein said layout depicted by said second level map further represents the location of said shopping center within a neighborhood.

8. The presentation and navigation method of claim 6 wherein at least one of said first level map and said second level map comprises one or more symbolic icons providing a non-textual indication of the type of business conducted by said store.

9. The presentation and navigation method of claim 3 further comprising providing a third level map depicting a larger physical area than said second level map, said area encompassing said area of said second level map, and providing a link from said third level map to said second level map.

10. The presentation and navigation method of claim 9 wherein said third level map comprises a depiction of the location of said area corresponding to said second level map and said link from said third level map to said second level map is associated with said location depiction.

11. The presentation and navigation method of claim 10 wherein said third level map depiction of said second level map area comprises a visual indication of the relative number of areas depicted by first level maps encompassed by said second level map.

12. The presentation and navigation method of claim 10 wherein said location depiction comprising said third level map further depicts the layout of those areas depicted on one or more second level maps and encompassed by said third level map.

13. The presentation and navigation method of claim 12 wherein said physical layout depicted by said first level map represents the location and shape of a store within a shopping center, said layout depicted by said second level map represents shape of the shopping center and the location of said shopping center within a neighborhood, and said layout depicted by said third level map represents the location of said neighborhood within a region.

14. The presentation and navigation method of claim 13 wherein said second level map depicts plural shopping centers and said layout depicted by said third level map further suggests the relative location and layout of said shopping centers within said neighborhood.

15. The presentation and navigation method of claim 14 further comprising providing a text based search capability which identifies at least one of a first level map or second level map corresponding to a string entered by a user of the method.

16. The presentation and navigation method of claim 15 wherein said string corresponds to a characteristic selected from: address, business name, business type, street name, town name, service provided, and goods sold.

17. A method of presenting and providing navigation through a series of maps, comprising:
    (a) providing plural store description pages, each comprising information related to each of plural stores;
    (b) providing plural shopping center maps, each:
        (i) encompassing a geographic area;
        (ii) illustrating the layout of a shopping center, and
        (iii) depicting the location and layout of at least some of said plural stores within said shopping center;
    (c) providing plural neighborhood maps, each:
        (i) depicting a geographic area larger than, and encompassing, the area of at least one of said shopping center maps,
        (ii) comprising a simplified depiction of the layout of said shopping center on said shopping center map, said depiction indicating the location of said shopping center, and
        (iii) comprising plural navigational symbols corresponding to relative physical directions, wherein activating one of said navigational symbols causes the display of the nearest neighborhood map depicting an area in that relative direction;

(d) providing at least one regional map:
  (i) depicting a geographic area larger than, and encompassing, the area of at least one of said neighborhood maps, and
  (ii) comprising a depiction of the location of the area of said at least one neighborhood map;
(e) providing a link from each of said store depictions on said shopping center map to the corresponding of said store description pages, whereby activation of said link causes said description page to be displayed;
(f) providing a link from each of said simplified shopping center depictions on said neighborhood map to the corresponding of said shopping center maps, wherein activation of said link causes said shopping center map to be displayed; and (g) providing a link from the depiction of the neighborhood location on said regional map to the corresponding of said neighborhood maps, wherein activation of said link causes said neighborhood map to be displayed.

18. The presentation and navigation method of claim 17 wherein said depiction of said neighborhood map areas on said regional map indicates the relative location and layout of said shopping centers within said neighborhood.

19. The presentation and navigation method of claim 17 wherein said depiction of said neighborhood map areas on said regional map comprises a visual indication of the relative number of shopping centers encompassed by said neighborhood map area.

* * * * *